Nov. 30, 1954     H. O. POWERS ET AL     2,695,705
PALLET CASE
Filed June 11, 1951     2 Sheets-Sheet 1
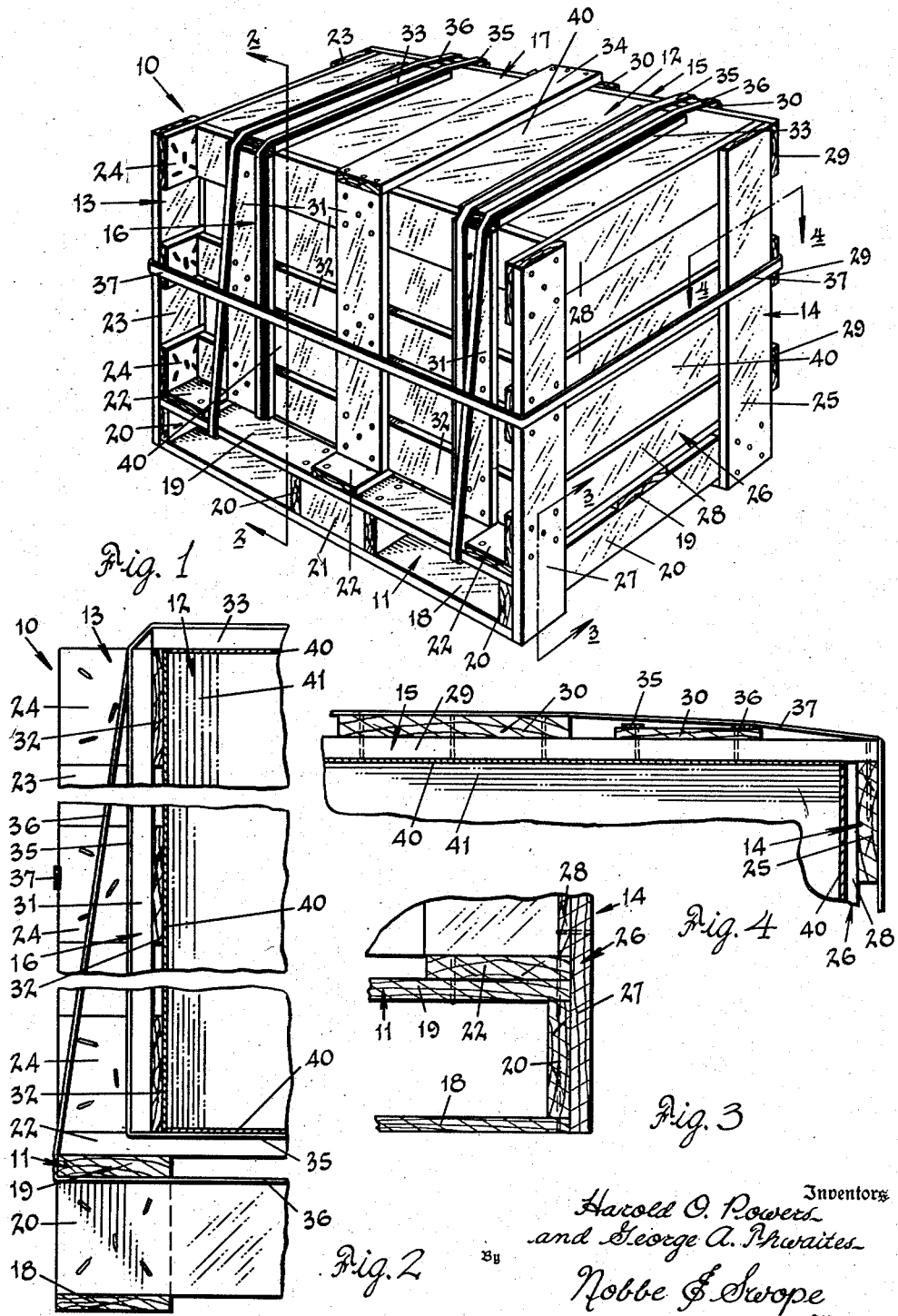
Inventors
Harold O. Powers
and George A. Thwaites
Nobbe & Swope
Attorneys Nov. 30, 1954
H. O. POWERS ET AL
2,695,705
PALLET CASE
Filed June 11, 1951
2 Sheets-Sheet 2
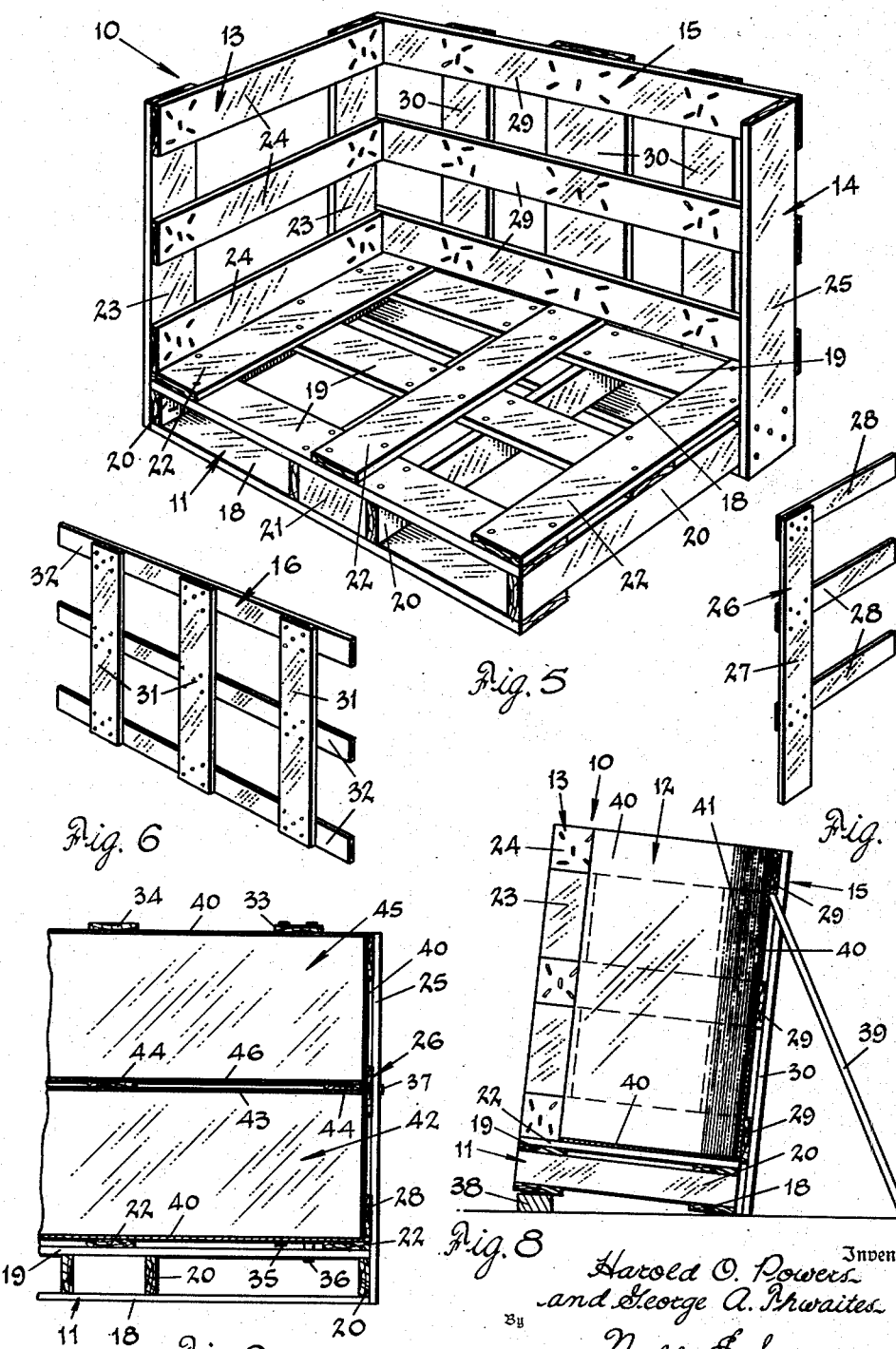

United States Patent Office 2,695,705
Patented Nov. 30, 1954

2,695,705

PALLET CASE

Harold O. Powers and George A. Thwaites, Charleston, W. Va., assignors to Libbey-Owens-Ford Glass Company, Toledo, Ohio, a corporation of Ohio Application June 11, 1951, Serial No. 231,013

7 Claims. (Cl. 206—62)

The present invention relates broadly to the art of packaging and more particularly to a new and improved pallet case for the storage and transportation of glass sheets and the like.

In the packaging of sheet glass by heretofore known methods it has been conventional practice to box the glass in either 50 or 100 foot lots. Regardless of the size or thickness of the individual sheets, each box contains a total footage of 50 or 100 square feet. However, sheets of like thickness and size, as well as quality, are placed in a single container.

Although excessive breakage was in general avoided by many of the 50 or 100 foot lot boxes developed, their use has left something to be desired in the packing and shipping of glass in large quantities. As for example, a considerable amount of time is required to handle, unload and warehouse the customary 50 or 100 foot boxes, a large area of valuable warehouse space is utilized, and careless handling and consequent breakage frequently result by virtue of their relatively light weight.

It is therefore an important object of the present invention to avoid the above and many other factors commonly associated with the storage and transportation of boxed glass by the provision of a relatively inexpensive shipping container capable of transporting a greater quantity of sheet glass at less weight with less likelihood of breakage than by heretofore known conventional methods.

Another object of the invention is to provide a pallet case which is readily transportable from one location to another by the customary fork lift truck and which may be vertically stacked one upon the other to conserve storage space.

Another object of the invention is the provision of a pallet case by means of which packing, unpacking and warehousing time is considerably diminished, and the space required for unpacking and warehousing substantially reduced.

A further object of the invention is to provide a shipping container which is capable of complete fabrication and is composed of a minimum number of parts that may be readily and quickly assembled at the situs of the loading operation.

A still further object of the invention is to provide a pallet case in which a relatively larger quantity of glass is packed, thereby allowing a more rapid and accurate inventory to be taken and resulting in the locating of a greater quantity of glass at the situs of use.

A still further object of the invention is the provision of a pallet case having a side section which is freely movable in a lateral or transverse direction and a loosely supported end construction, both being capable of ready removal, whereby standard size pallets and boxes may be employed with little structural change for the packaging and shipment of a variety of glass sheets of different sizes and thicknesses.

Other objects and advantages of the invention will become more apparent during the course of the following description when taken in connection with the accompanying drawings.

In the drawings wherein like numerals are employed to designate like parts throughout the same:

Fig. 1 is a perspective view of a completed pallet case constructed in accordance with this invention;

Figs. 2 and 3 are vertical sections taken substantially on lines 2—2 and 3—3, respectively, of Fig. 1;

Fig. 4 is a horizontal section taken substantially on line 4—4 of Fig. 1;

Fig. 5 is a perspective view of the construction of the pallet case partially disassembled;

Fig. 6 is a perspective view of the movable side section;

Fig. 7 is a perspective view of a portion of the end construction herein disclosed;

Fig. 8 is a perspective view showing the elevation of one side of the case, as during the loading thereof; and Fig. 9 is a vertical cross sectional view of a modified form of the invention.

In the accompanying drawings is shown a preferred form of the invention, wherein is provided a substantially rectangular pallet case designated in its entirety by the numeral 10 and comprising a pallet type bottom 11 and a substantially rectangular box 12 carried thereupon, the latter consisting of end sections 13 and 14, side sections 15 and 16, and a top or lid 17.

The pallet type bottom 11, which constitutes the floor or base of the shipping container 10, is composed of longitudinally extending floor boards 18 and deck boards 19. Arranged between and secured to the floor and deck boards are transversely extending stringers 20 which are disposed at opposite ends of the bottom and also intermediate the ends thereof. In order to grant greater rigidity to the pallet bottom and prevent rotation or movement of the stringers 20, end bracing stringers 21 may be located between the center stringers 20 adjacent the ends thereof and in perpendicular relation thereto. Secured to the upper surface of the deck boards in transverse relation thereto and functioning to provide a level support for the glass sheets to be stacked thereupon are transverse deck members 22.

As may be seen in Figs. 2 and 5, the end section 13 comprises vertical end members 23 secured by nails or the like to horizontal end members 24. The vertical members extend downwardly over the end of the pallet bottom 11 and are secured thereto through the end stringer 20, while the lower horizontal member 24 of the end section 13 abuts upon the outer transverse deck member 22 in perpendicular relation thereto.

The other end section, which has been designated above in its entirety by the numeral 14, comprises a stationary vertical member 25, shown in Figs. 1 and 5 affixed at its bottom to an end stringer 20, and a separate floating end portion 26. This latter portion consists of a vertical end member 27 secured to horizontal end members 28, while said floating portion 26 is not secured by nailing or other similar means to the remainder of the pallet case 10 but is readily located in place and easily removed, as will be subsequently hereinafter explained.

The substantially rectangular box 12 further consists of a side section 15 (Fig. 5), comprising horizontal side members 29 to which are attached vertical side members 30. It is to be noted that the center vertical memebr 30 is of relatively greater width than the other of said members in order to impart additional rigidity to the side section 15 and the box 12 itself. The horizontal side members 29 are in general horizontal alignment with the horizontal end members 24 and 28 of the end sections 13 and 14 respectively, to further brace the container, and said horizontal side members 29 overlap the vertical end member 23 and stationary vertical member 25 of the end sections 13 and 14 respectively, and are secured to said vertical members in perpendicular relation thereto, as shown in Figs. 4 and 5. As is the case with the horizontal members of the end sections, the lower horizontal member 29 of the side section 15 rests upon the transverse deck members 22.

Forming a part of the pallet case herein disclosed, and allowing considerable diversity in the use of standard size pallet bottoms and boxes for the packaging of stacks of glass of varying sizes, is the freely movable side section 16 illustrated particularly in Fig. 6. This section comprises vertical side members 31 secured to horizontal side members 32 by any suitable means, and when said side section is supported on edge upon the pallet bottom in the manner shown in Fig. 1, it is not attached to the bottom or to other sections of the box 12 by any nailing means. Rather, and as will be presently described, strapping is the sole means securing the side section 16 to the other sections 13, 14 and 15.

Thus, when the movable side section 16 is loosely positioned upon the pallet bottom 11, the center vertical member 31 of said section 16 is in vertical alignment with and in perpendicular abutting relation to the center transverse deck member 22. Further, the horizontal side members 32 of said movable section are in horizontal alignment with the horizontal members 24, 28 and 29 of the end sections 13 and 14 and side section 15, respectively. Also, when so positioned, the ends of the horizontal side members 32 perpendicularly abut against the inner surfaces of the horizontal members of the end sections and thus prevent undesirable inward movement of the end sections 13 and 14 against the glass stack packaged therebetween during handling and transportation thereof.

It may thus be seen that this side section 16, by virtue of its construction and location relative to the other sections of the container, performs an important bracing function and effectively precludes the transmission of damaging stresses and strains to the glass stack supported thereagainst. Yet at the same time, the side section 16, not being nailed to any other element of the container, is adaptable for use with glass stacks, pallet bottoms and boxes of varying sizes.

Thus, as seen in Fig. 1, the side section 16 is disposed inwardly of the ends of the transverse deck members 22 and thereby there is created, with the particular size glass stack illustrated for purposes of example, an open or void space outwardly of the exposed surface of said side section. However, when it is desired to package a greater or lesser quantity of glass sheets whereby the thickness of the stack will be correspondingly increased or decreased, the side section 16 may be conveniently moved outwardly or inwardly on the transverse deck members 22 to compensate for this change without the necessity of varying the dimensions of the pallet bottom 11 or other members of the box 12.

The top or lid 17 of the box 12 comprises a pair of transversely extending members 33 substantially equal in length to the distance between the inner surfaces of the side sections 15 and 16. These members 33 are arranged generally on line with the vertical members 30 and 31 of the side sections 15 and 16, and rest upon the top of the glass stack without direct attachment to said side sections. If desired, however, an additional top member 34 may be positioned centrally of the glass stack and intermediate the members 33 for additional bracing support. In such case, the member 34, which is preferably of relatively greater length than the members 33, may be attached by nails or the like to the center vertical members 30 and 31 of the side sections 15 and 16, respectively.

In order to maintain the side section 16 rigid with respect to the other side section 15 and pallet bottom 11, and in firm contacting relation with the glass stack, the entire box 12 secure to the pallet bottom, and the end section 14 rigidly against the glass stack, there is provided a plurality of transversely or laterally extending straps 35 and 36 and at least one longitudinal strap 37. As may be seen in Fig. 1, a pair of transverse straps 35 are arranged around the girth of the box itself and in parallel contact with the vertical side members 31, top members 33 and vertical side members 30 of the side section 16, top or lid 17 and side section 15, respectively. The other pair of transverse straps 36 parallel the path of the transverse straps 35 but extend beneath the deck boards 19 of the pallet bottom 11 to secure the box 12 thereto. The longitudinal strap 37 is arranged generally centrally of the vertical dimension of the box and is tightened to bite into the vertical members 23, 25 and 27 of the end sections 13 and 14.

In the practice of the invention, after the pallet bottom 11 has been fabricated and the transverse deck members 22 attached to the upper surface thereof, the end section 13 is positioned against one end of the pallet bottom whereby the lower horizontal member 24 of said end section rests upon an outer transverse deck member 22. This end section is then secured to the pallet bottom by driving nails or the like through the lower portions of the vertical members 23 of said end section into an outer stringer 20. The stationary vertical member 25 of the end section 14 is then nailed or otherwise fastened to the opposite end of the pallet bottom in the manner clearly shown in Fig. 5. The stationary side section 15 is next located with the horizontal members 29 thereof in horizontal alignment with the horizontal members 24 of the end section 13 and is secured by any suitable means such as nails or screws to the vertical end members 23 and 25 of the end sections 13 and 14, as shown in Figs. 4 and 5.

The pallet case 10 is now ready for loading, and in order to prevent the glass sheets or the like being packed therein from falling forward during the loading operation, a blocking piece 38 is located under the loading side of the container in parallel underlying relation to one of the floor boards 18. To further support the side section 15 against the weight of the sheets packaged thereagainst, a bracing member 39 is preferably positioned against a horizontal side member 29 of the side section 15 and the floor or ground in angular relation thereto.

One or more sheets of double-face corrugated cardboard, paperboard, fiberboard or the like 40 are arranged in parallel contact with the inner surfaces of the end section 13, side section 15 and transverse deck members 22 to adequately cushion the edges and faces of the glass sheets to be located thereagainst. A plurality of glass sheets or the like 41 are then positioned in parallel relation to the side section 15 with the lower edges of said sheets running transversely to the transverse deck members 22 and parallel to the floor and deck boards 18 and 19. In accordance with customary procedure, sheets of paper, wood flour or other similar materials are preferably placed between the individual glass sheets to prevent scratching of the surfaces thereof.

When a predetermined number of glass sheets 41 have been stacked in the manner above indicated outwardly from the side section 15, the floating end portion 26 (Fig. 7) of the end section 14 is properly located. This is readily accomplished by inserting the horizontal members 28 of said floating portion between the end edges of the glass sheets and the inner surface of the stationary vertical member 25 whereby said horizontal members 28 are in horizontal alignment with the horizontal end and side members 24 and 29 of the end sections 13 and 15. A sheet of corrugated material 40 is then positioned between the edges of the sheets 41 and the now completed end section 14 and another sheet of the same material laid against the outer surface of the last glass sheet placed in the stack.

The movable or freely supported side section 16 is located upon the transverse deck members 22 and between the end sections 13 and 14 in the manner shown in Fig. 1. In the position shown it will be noted that the center vertical member 31 of said side section 16 is on a vertical line with the center transverse deck member and that the horizontal members 32 of the same said section are horizontally in alignment with the horizontal members of the end and side sections, thereby allowing each section to grant to and receive bracing support from the opposite and adjacent section thereto. It is to be particularly noted that the support provided by the side section 16 is not dependent upon the use of nailing means but exists by virtue of its position relative to the other members of the case and the use of readily applied and easily removed strapping.

To complete the shipping container herein disclosed, additional sheets of corrugated material 40 are laid upon the upper edges of the glass sheets 41 and the top members 33 positioned loosely thereupon as shown in Figs. 1 and 2. As was noted above, in certain cases it may be desirable to additionally support the box 12 and for this purpose a center top member 34 may be located intermediate the members 33 and secured to the vertical members 30 and 31 of the side sections 15 and 16.

The transverse straps 35 are then arranged and tightened around the girth of the box itself whereby they are in contact with the outer vertical members of the side sections, and this is preferably followed by the application of the transverse straps 36, also around the girth of the box, and also on line with the side section vertical members, but under the deck boards 19 as described above and shown in Figs. 1 and 2. The longitudinal strap 37 is next tightly positioned on line with the center horizontal members of both end and side sections. It will thus be seen that by the novel method of arranging the straps the freely supported side section 16 is held tightly against the glass stack, the box 12 adequately anchored to the pallet bottom 11 and the end sections 13 and 14 prevented from moving outwardly during handling of the pallet case 10. Although metal strapping is preferred, leather, cotton and other suitable strapping materials may be used if desired.

The present invention has the further important advantage of simplified disassembly upon reaching its destination. The unpacking procedure involves the simple steps of elevating and blocking the case by the blocking piece 38 and bracing member 39, cutting the strapping, removing the top or lid 17, sliding out the side section 16, lifting off the floating end portion 26 of the end section 14, and removing the appropriate corrugated material. The glass sheets are now exposed and ready for use. When a portion of the stack of glass sheets has been used and it is decided to return the pallet case to storage, corrugated material may be placed against the exposed surface of the glass stack remaining, the side section 16 returned to its position in parallel contact with the stack and transverse straps the equivalent of the straps 35 above described utilized to hold the stack against the side section 15. After the blocking piece 38 and bracing member 39 have been removed the pallet case may be moved by conventional fork lift means to the warehouse.

In Fig. 9 is shown a modified form of the invention designed for the packaging of glass sheets of relatively lesser size than has been described above. That is to say, the modified form is particularly suitable when sheets of relatively less height are stacked in two or more parallel rows within the box. For this purpose there is provided on top of the lower stack 42 of glass sheets a sheet of corrugated cardboard or the like 43 onto which are positioned separator members 44 extending transversely of the box 12. Serving to cushion the lower edges of the upper stack 45 of glass sheets is another layer of corrugated material 46 located upon the separator members 44. All other features of this modified form are substantially as above described with reference to the preferred form of the invention.

From the foregoing description of the present invention it will be apparent that a pallet case has been provided which is possessive of considerable flexibility of use, allows shipment of a greater quantity of packaged articles with less likelihood of breakage, may be readily handled and stacked with conventional materials handling devices, and is capable of speedy and accurate assembly and disassembly at the situs of loading or use. By means of a readily inserted floating end portion 26 the glass sheets may be quickly and safely loaded into the box 12 and yet adequately braced when placed therein, a substantial improvement over heretofore known four-walled containers which were loaded from the top. Further, by virtue of the freely supported side section 16 herein disclosed, the box 12 may be speedily loaded, readily assembled and disassembled, and utilized for the packaging of glass sheets and the like in boxes and on pallet bottoms of a variety of sizes with little, if any, change in structure.

Although the invention has been described above with reference to the packaging and shipment of glass sheets or plates, it will be appreciated that the container is suitable for a variety of uses and is not restricted to the purpose herein disclosed.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

We claim:

1. In a shipping container of the character described, a bottom comprising a deck and members elevating said deck from a supporting surface to permit entry of lift forks beneath said deck, a plurality of sheets supported on edge upon said deck, an end section fixedly secured to one end of said bottom and having a portion arranged in overlapping relation thereto, another end section having a portion thereof loosely supported upon the deck, a side section attached in overlapping relation to said end sections, another side section of lesser size than said other side section freely supported upon the deck between said first-mentioned end section and the loosely supported portion of said last-mentioned end section and capable of movement toward and away from said attached side section, a top disposed between the side sections, and retaining means tying the bottom, side and end sections and top together.

2. In a shipping container of the character described, a bottom comprising a deck and members elevating said deck from a supporting surface to permit entry of lift forks beneath said deck, a plurality of sheets supported on edge upon said deck, an end section fixedly secured to one end of said bottom and having a portion arranged in overlapping relation thereto, another end section comprising a vertical member secured to the opposite end of said bottom and a portion loosely supported upon the deck in contact with said vertical member, a side section attached in overlapping relation to said first-mentioned end section and to said vertical member, another side section of lesser size than said other side section freely supported upon the deck between said first-mentioned end section and the loosely supported portion of said other end section and capable of movement toward and away from said attached side section, a top disposed between said side sections, and retaining means tying the bottom, side and end sections and top together.

3. In a shipping container of the character described, a bottom comprising a deck and members elevating said deck from a supporting surface to permit entry of lift forks beneath said deck, members disposed transversely of the deck and secured thereto, a plurality of sheets supported on edge upon said members, an end section fixedly carried upon one of said transverse members and having a portion secured in overlapping relation to one end of the bottom, another end section comprising a vertical member secured in overlapping relation to the opposite end of said bottom and a portion loosely supported upon a transverse member in contact with said vertical member, a side section abutting the ends of the transverse members and attached in overlapping relation to said first-mentioned end section and to said vertical member, another side section of lesser size than said other side section freely supported upon the transverse members between said first-mentioned end section and the loosely supported portion of said last-mentioned end section and capable of movement toward and away from said first-mentioned side section, a top disposed between said side sections, and retaining means tying the bottom, side and end sections and top together.

4. In a shipping container of the character described, a bottom comprising a deck and members elevating said deck from a supporting surface to permit entry of lift forks beneath said deck, supporting members disposed parallel to said elevating members and secured to the upper surface of the deck, a plurality of sheets supported on edge upon said members, an end section fixedly carried upon one of the supporting members and secured to an end elevating member, another end section comprising a vertical member secured to the opposite end elevating member and a portion loosely supported upon a supporting member in overlapping relation to said vertical member, a side section abutting the ends of the supporting members and attached in overlapping relation to said first-mentioned end section and to said vertical member, another side section of lesser size than said other side section freely supported upon the supporting members inwardly of the ends thereof between said first-mentioned end section and the loosely supported portion of said last-mentioned end section and capable of movement toward and away from said first-mentioned side section, a top disposed between said side sections, and retaining means tying the bottom, side and end sections and top together.

5. In a shipping container of the character described for a stack of glass sheets and the like, a bottom comprising a deck and members elevating said deck from a supporting surface to permit entry of lift forks beneath said deck, a plurality of glass sheets supported on edge upon said deck, an end section fixedly secured to one end of said bottom and having a portion arranged in overlapping relation thereto, another end section comprising a vertical member secured in overlapping relation to the opposite end of said bottom and a portion loosely supported upon the deck in contact with said vertical member, a side section attached in overlapping relation to said first-mentioned end section and to said vertical member, another side section of lesser size than said other side section freely supported upon the deck between said first-mentioned end section and the loosely supported portion of said other end section and capable of movement toward and away from said attached side section, a top disposed between said side sections, flexible retaining members tying the side sections and top together and to the deck in firm contacting relation with the stack of sheets, and additional flexible retaining means in contact with the end sections and preventing movement of said sections outwardly of the stack of glass sheets.

6. A glass package comprising a shipping container including a deck and members elevating said deck to permit entry of lift forks beneath said deck, transversely extending support members attached to the upper surface of the deck along opposite ends and intermediate said ends thereof, an end section fixedly secured to an end elevating member, another end section comprising a vertical member attached to the opposite end elevating member and a portion loosely supported upon an end supporting member, a side section abutting upon the ends of the supporting members and attached in overlapping relation to said first-mentioned end section and to said vertical member, a plurality of glass sheets stacked one against the other and against said side section, said stack of sheets being supported on edge upon said supporting members in engagement with said first-mentioned end section and the loosely supported portion of said last-mentioned end section, another side section of lesser size than said other side section freely supported upon the supporting members inwardly of the ends thereof and in contact with the stack of glass sheets between the end sections, and a top disposed between the side sections, said freely supported side section being capable of movement toward and away from said first-mentioned side section depending upon the thickness of said stack of sheets.

7. A glass package comprising a shipping container including a deck and members elevating said deck to permit entry of lift forks beneath said deck, transversely extending support members attached to the upper surface of the deck along opposite ends and intermediate said ends thereof, an end section fixedly secured to an end elevating member, another end section comprising a vertical member attached to the opposite end elevating member and a portion loosely supported upon an end supporting member, a side section abutting upon the ends of the supporting members and attached in overlapping relation to said first-mentioned end section and to said vertical member, a plurality of glass sheets stacked one against said side section, said stack of sheets being supported on edge upon said supporting members in engagement with said first-mentioned end section and the loosely supported portion of said last-mentioned end section, another side section of lesser size than said other side section freely supported upon the supporting members inwardly of the ends thereof and in contact with the stack of glass sheets between the end sections, said freely supported side section being capable of movement toward and away from said first-mentioned side section depending upon the thickness of said stack of sheets, a top disposed between the side sections, flexible retaining members tying the end and side sections and top together, and additional flexible retaining means securing said sections and top as a unit upon the deck.

References Cited in the file of this patent

UNITED STATES PATENTS

| Number | Name | Date |
|---|---|---|
| 1,193,567 | Lane et al. | Aug. 8, 1916 |
| 1,618,542 | Ludwig | Feb. 22, 1927 |
| 2,005,099 | McLeod | June 18, 1935 |
| 2,080,185 | Rathgeber | May 11, 1937 |
| 2,159,622 | Sanford | May 23, 1939 |
| 2,420,640 | Acteson | May 20, 1947 |
| 2,503,562 | Porter | Apr. 11, 1950 |
| 2,512,145 | Ford | June 20, 1950 |

FOREIGN PATENTS

| Number | Country | Date |
|---|---|---|
| 322,817 | Great Britain | Dec. 16, 1929 |